(12) United States Patent
Frauenkron

(10) Patent No.: US 9,079,588 B2
(45) Date of Patent: Jul. 14, 2015

(54) METHOD AND DEVICE FOR OUTPUTTING DRIVING INFORMATION INDICATING AN ACCELERATION OPTION THAT IS OPTIMAL IN TERMS OF POWER CONSUMPTION IN A MOTOR VEHICLE

(75) Inventor: Helge Frauenkron, Markgroeningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1073 days.

(21) Appl. No.: 12/616,404

(22) Filed: Nov. 11, 2009

(65) Prior Publication Data
US 2010/0152956 A1    Jun. 17, 2010

(30) Foreign Application Priority Data
Dec. 16, 2008  (DE) .......................... 10 2008 054 703

(51) Int. Cl.
*G01F 9/00*  (2006.01)
*G06F 19/00*  (2011.01)
*B60W 50/14*  (2012.01)

(52) U.S. Cl.
CPC .................................... *B60W 50/14* (2013.01)

(58) Field of Classification Search
USPC .............. 701/70, 99, 101, 110, 123; 340/439, 340/441, 467; 73/114.52, 114.53
See application file for complete search history.

(56) References Cited

U.S. PATENT DOCUMENTS

| 6,092,021 A * | 7/2000 | Ehlbeck et al. ................ 701/123 |
| 2005/0021222 A1* | 1/2005 | Minami et al. ................ 701/123 |
| 2006/0282199 A1* | 12/2006 | Daum et al. ..................... 701/19 |

FOREIGN PATENT DOCUMENTS

| JP | 62-146735 | 6/1987 |
| JP | 2005-76772 | 3/2005 |
| JP | 2006-76415 | 3/2006 |
| JP | 2008-239130 | 10/2008 |

* cited by examiner

*Primary Examiner* — Adam Tissot
(74) *Attorney, Agent, or Firm* — Kenyon & Kenyon LLP

(57) ABSTRACT

A method for outputting driving information to indicate a power consumption-optimized driving state to a driver of a motor vehicle, including the following steps of ascertaining a target vehicle acceleration that is optimal in terms of consumption, as a function of at least one current operating state quantity of the vehicle, as well as of at least one tractive-resistance quantity, ascertaining an actual vehicle acceleration, generating the driving information as a function of the ascertained target vehicle acceleration and of the actual vehicle acceleration, and outputting the driving information.

22 Claims, 3 Drawing Sheets

METHOD AND DEVICE FOR OUTPUTTING DRIVING INFORMATION INDICATING AN ACCELERATION OPTION THAT IS OPTIMAL IN TERMS OF POWER CONSUMPTION IN A MOTOR VEHICLE

RELATED APPLICATION INFORMATION

The present application claims priority to and the benefit of German patent application no. 10 2008 054 703.4, which was filed in Germany on Dec. 16, 2008, the disclosure of which is incorporated herein by reference.

FIELD OF THE INVENTION

The present invention relates to a method and a device for outputting driving information to a driver of a motor vehicle to inform the driver of a driving state of the motor vehicle that is more optimal in terms of power consumption.

BACKGROUND INFORMATION

Triggered by the CO2 debate, as well as rising energy costs, importance is being increasingly accorded nowadays to a reduced fuel consumption and thus, accordingly, to lower automotive pollutant emissions. Significant technical efforts are underway to design engines and vehicle drives to be more efficient (variable valve stroke, cylinder cutoff, hybrid drives, etc.). These efficiency-enhancing systems make it possible to reduce fuel consumption in the active operating state (which is decisively determinable by engine speed, the engaged gear, velocity and acceleration).

However, the driver selects the active operating state. Various displays in motor-vehicle instrument clusters are used to make the driver aware of a fuel-inefficient operating state. Customary, in this context, are, on the one hand, the fuel-consumption gauge and, on the other hand, what is generally referred to as the "gearshift indicator," respectively, the "gear indicator." The purpose of the latter is to indicate to the driver the option of engaging that gear which permits a more energy-efficient driving.

A disadvantage associated with the known, related-art fuel-consumption indicators is that they do not inform the driver to what extent, in the current driving situation, a more power-efficient, respectively more fuel-efficient operating state is possible. Since the displayed numerical values are absolute values, which are only to be interpreted by the driver along the lines of a consumption reduction, such a display does not readily aid the driver in optimizing his/her driving behavior. The fuel-consumption indicator does not provide information as to where, in the current driving situation, a more fuel-efficient operating state resides.

The "shift-up indicators" or the "gear indicators" under the related art are effective aids which facilitate driving in the "correct" gear. However, given a steady-state driving or a driving between two shift points—thus, in the interval from one gear shift to a new gear shift—disadvantages become evident as soon as the need arises to reduce the consumption.

This is clarified on the basis of the steady-state driving example, which is characterized by substantially constant speed: If, by actuating the accelerator, the driver increases the driving torque more than is needed for the steady-state driving, the vehicle will accelerate imperceptibly. However, such low accelerations are not accurately perceivable or distinguishable by the driver in the vehicle. This holds true all the more when the driver is distracted by particular influences or is unfocused. In some instances, the driver does not notice the higher speed until after driving a few kilometers; whereupon he/she removes his/her foot from the accelerator to reduce the driving torque in order to slightly reduce the speed again. In this context, it is particularly disadvantageous when the driver unknowingly accelerates slightly when driving uphill, since the needless acceleration consumes disproportionately more power or fuel. In this case, shift-up indicators are of no further assistance since, with regard to the slight changes, they do not provide any practical recommendation of action to be taken.

SUMMARY OF THE INVENTION

It is, therefore, an object of the exemplary embodiments and/or exemplary methods of the present invention to devise a method and a device which will make it easier for a user to reduce the fuel consumption of a motor vehicle.

This objective is achieved by the method as set forth herein, as well as by the device as set forth herein.

In accordance with one first aspect, a method is provided for outputting driving information to indicate a power consumption-optimized driving state to a driver of a motor vehicle, including the following steps:

ascertaining a target vehicle acceleration that is optimal in terms of consumption, as a function of at least one current operating state quantity of the vehicle, as well as of at least one tractive-resistance quantity;

ascertaining an actual vehicle acceleration;

generating the driving information as a function of the ascertained target vehicle acceleration and of the actual vehicle acceleration; and outputting the driving information.

In addition, in one advantageous specific embodiment, the at least one operating state quantity may include a vehicle velocity and/or an engine speed.

In accordance with another specific embodiment, the at least one current operating state quantity, which is used for ascertaining the target acceleration, may include at least one of the quantities: vehicle actual acceleration, drive position information, a vehicle weight indication, as well as an indication as to whether the vehicle is operated with a trailer.

In addition, the driving information may be output in a way that allows the driver to recognize whether the actual vehicle acceleration is less than or greater than the target vehicle acceleration of the driving state that is optimal in terms of consumption.

In another specific embodiment, the driving information may be weighted or valuated with a weighting factor that differs, in particular, as a function of the drive position. Thus, from case to case, different weighting factors are possible, for example, depending on the engaged drive position.

In accordance with one specific embodiment, the driving information may be optically and/or haptically and/or acoustically output in the motor vehicle.

In addition, in another specific embodiment, the method may be applied in the steady-state driving operation and/or in the acceleration phases between two shift points, the first shift point signifying an instant of clutch engagement when a gear is engaged, and the second shift point signifying an instant of clutch disengagement when another gear is engaged.

In accordance with another aspect, a device is provided for outputting driving information to indicate a power consumption-optimized driving state to a driver of a motor vehicle, including:

a determination device for ascertaining a target vehicle acceleration that is optimal in terms of consumption, as a function of at least one current operating state quantity of the vehicle, as well as of at least one tractive-resistance quantity;

a transducer device for ascertaining an actual vehicle acceleration;

a device for generating the driving information as a function of the ascertained target vehicle acceleration and of the actual vehicle acceleration; and an output device for outputting the driving information.

In accordance with another aspect, a motor vehicle is provided which has the above device for outputting the driving information.

In accordance with another aspect, a computer program is provided which, when it is executed on a data processing unit, implements the above method.

Exemplary embodiments of the present invention are explained in greater detail in the following with reference to the accompanying drawings.

DETAILED DESCRIPTION

Figure 1:
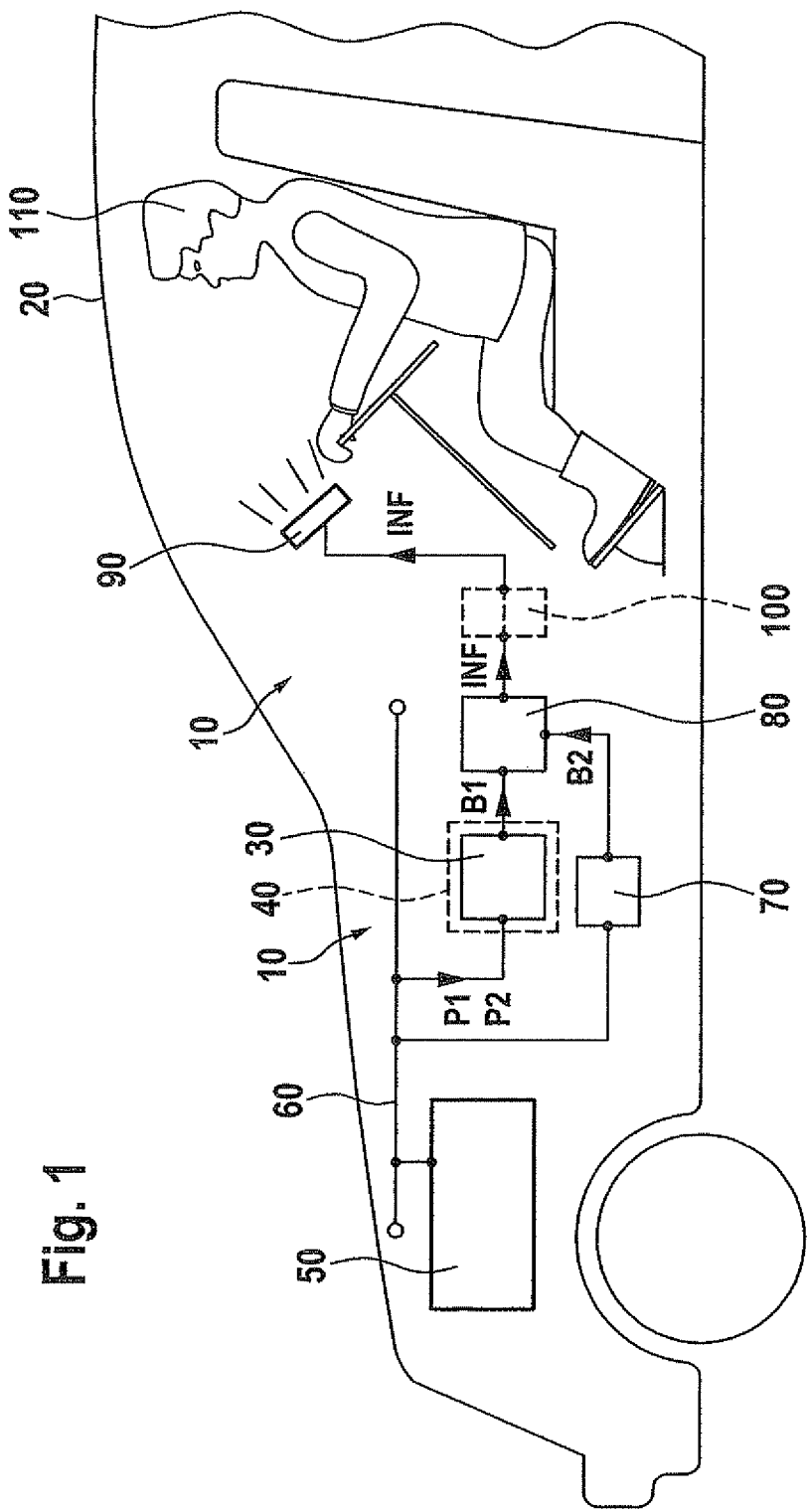
FIG. 1 shows a schematic representation of a motor vehicle having a device for outputting driving information.

In the following description and drawings, the same reference numerals denote like or similar functions or like or similar method steps.

Along the lines of this description, the concept of acceleration includes both positive as well as negative accelerations (decelerations). In addition, in this case, acceleration is always understood to be a longitudinal vehicle acceleration, respectively a vehicle acceleration in the driving direction. The concept of the roadway grade denotes an uphill or downhill grade of the roadway relative to the horizontal, thus an angle other than zero between the roadway and the horizontal for the case that a roadway grade is present in the sense of an uphill or downhill grade. A roadway grade is present when a force that is independent of a drive motor acts in the longitudinal vehicle direction.

FIG. 1 shows exemplarily a device 10 for implementing the method in accordance with the present invention in conjunction with a motor vehicle 20. Device 10 may be installed in a motor vehicle 20, for example, in an automobile or a truck, or, alternatively, for example, in a motorcycle.

Device 10 includes a determination device 30 for determining a consumption-optimized target vehicle acceleration B1. In this context, determination device 30 may be a control unit 40 or part of a control unit 40 of motor vehicle 20, for example, an electronic control unit in the form of the engine control unit which is used for controlling a driving engine 50, or an ESP control unit, or it may be realized in the form of an on-board computer or an instrument cluster. To control the operation of the motor vehicle, determination device 30 communicates with the principal components, which may be via a data bus 60, for example via a sufficiently known CAN bus or similar vehicle electrical systems. Required parameters or variables, which are supplied by connected control units, sensors and components, are exchanged via data bus 60.

To determine the consumption-optimized target acceleration, determination device 30 is provided with one or more different input quantities, respectively current operating state quantities P1, such as, velocity, acceleration or engine speed, in a suitable form, which may be via data bus 60. In some instances, it may be provided that determination device 30 generate the at least one required current operating state quantity P1 from the supplied input quantities.

In addition, a tractive-resistance quantity P2 is supplied to determination device 30 to determine vehicle acceleration B1 that is optimal in terms of consumption. This may likewise be accomplished via data bus 60.

Tractive-resistance quantity P2 may be obtained from a modeled tractive resistance in conjunction with the drive power used in the case of the momentary vehicle velocity. The drive power may be ascertained, for example, by one or more on-board control units (transmission control unit, engine control unit, etc.) and be made available to ascertain target acceleration B1, for example, via data bus 60. In this context, the modeled tractive resistance takes the rolling resistance and/or air resistance and/or climbing resistance and/or an acceleration resistance of vehicle 20, for example, into account. The tractive resistance may be ascertained in a manner known per se from an actual vehicle acceleration and the drive power that must be applied by engine 50. Tractive resistance quantity P2 indicating the tractive resistance may correspond, for example, to a roadway-grade dependent quantity and be provided by an on-board GPS system and be indicative of the momentary roadway grade or be supplied by a transmitter designed for this purpose.

Alternatively or additionally, determination device 30 may form tractive resistance quantity P2 from one or more supplied input quantities. Operating state quantity P1 and tractive resistance quantity P2 are then fed to a characteristic map stored in determination device 30 that may be ascertained computationally or empirically. The characteristic map defines a target vehicle acceleration B1 that is optimal in terms of power consumption, as a function of quantities P1 and P2, allowing target vehicle acceleration B1 to be ascertained from the characteristic map. The characteristic map may be programmed in and made available as a look-up table. Alternatively, the characteristic map may also be described by a physical model.

A transducer device 70 (for example, an on-board control unit or a computer) delivers an instantaneous actual vehicle acceleration B2, for example via a data bus 60. The actual vehicle acceleration may be derived from information from a selected drive position and a speed change. Actual vehicle acceleration B2 is fed to a driving-information supply device 80, which generates driving information INF that indicates a more fuel-efficient acceleration option to a driver of the vehicle. In this context, driving-information supply device 80 may be designed as part of determination device 30 or separately therefrom, for example, as a computer or part of another control unit.

In addition, driving-information supply device 80 receives target vehicle acceleration B1 ascertained by determination device 30, as an input quantity, for example, via data bus 60 or in another suitable manner. From target vehicle acceleration and actual vehicle acceleration B1, B2, device 80 ascertains driving information INF to be output.

Driving information INF may, in some instances, be weighted or valuated by a processing unit 100, for example, a control unit or a computer. The processing unit may also be part of devices 30 or 80, for example, or be identical thereto.

An output device 90 outputs driving information INF to driver 110, as an indication of a consumption-optimized driving state.

Figure 2:
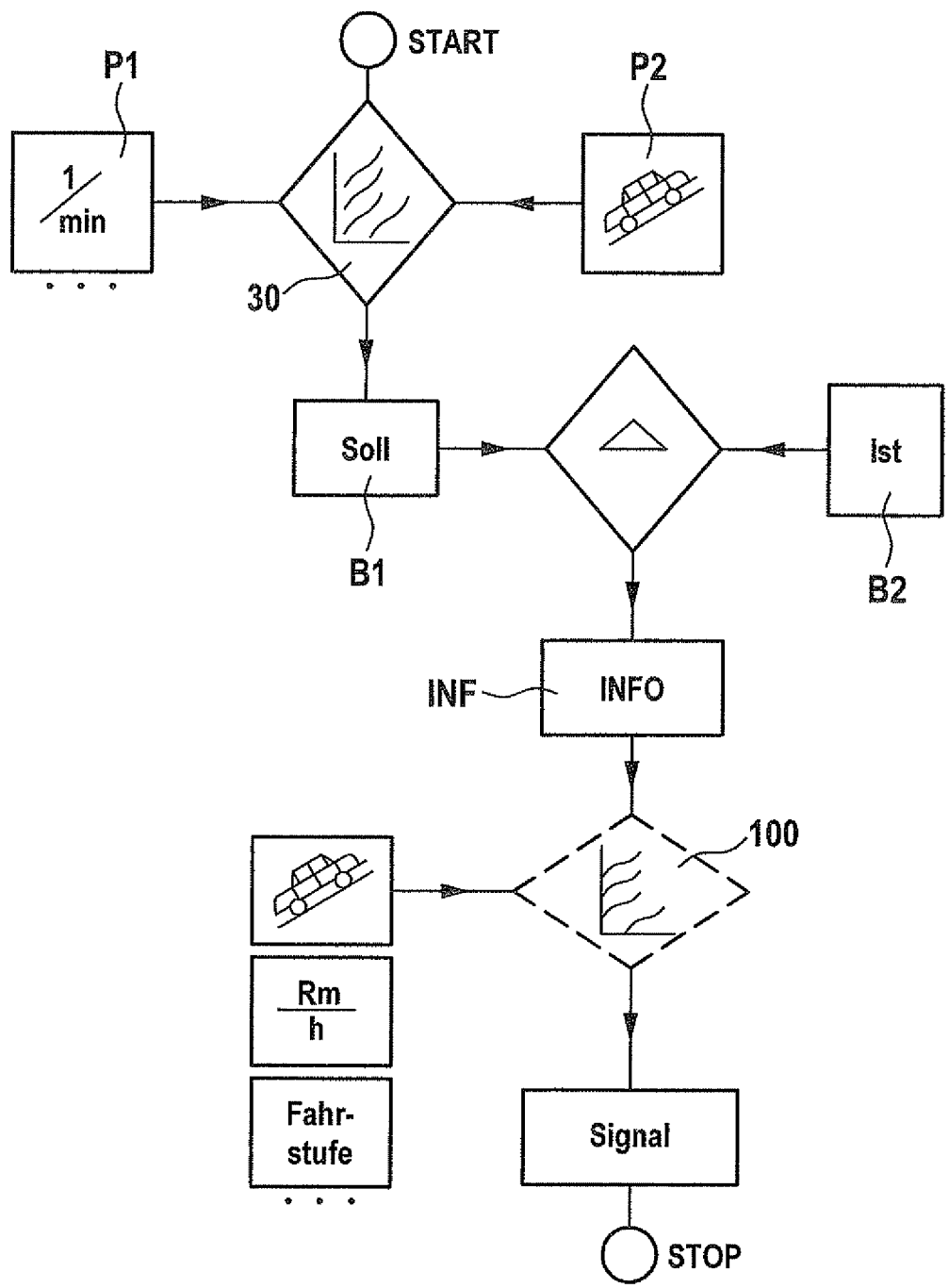
FIG. 2 shows a diagram for illustrating one possible specific embodiment.

At this point, the method for outputting the driving information is clarified on the basis of the diagram according to FIG. 2. A consumption-optimized target vehicle acceleration B1 is first ascertained from at least one current operating state quantity P1 of vehicle 20, as well as from at least one tractive-resistance quantity P2. The (for example, filtered or smoothed) vehicle velocity may be used as current operating state quantity P1; however, a (filtered or smoothed) vehicle acceleration, information on the engaged gear (gear information), respectively, a selected drive position, may also be used to ascertain the driving information. Moreover, an engine speed and, optionally, a vehicle weight or information as to whether a trailer is hitched (trailer operation) may also be taken into consideration.

Driving resistance quantity P2 may be supplied, as already described above. An indication of a target acceleration B1 that is optimal or optimized in terms of power consumption is obtained with the aid of a stored or saved characteristic map, which is supplied with operating state quantities P1 and tractive resistance quantity P2. The characteristic map may be ascertained computationally or empirically.

The dependency on the roadway grade is important in this context because, depending on the grade, acceleration states have a different effect on the power consumption than in the case of a level roadway. Thus, in the case of a downhill driving, a positive acceleration may have a positive effect on the consumption. However, in the case of the uphill driving, a slight deceleration is beneficial with regard to the power consumption. This may be considered when ascertaining target acceleration B1 that is optimal in terms of consumption, using the stored characteristic maps.

Once optimal target vehicle acceleration B1 is ascertained, driving information INF is generated as a function of actual vehicle acceleration B2, which indicates a driving state that is more optimal in terms of consumption in the present driving situation, so that the driver is able to deduce therefrom whether he/she needs to accelerate or decelerate the vehicle in order to reach this driving state.

To this end, ascertained target acceleration B1 is fed to device 80, for example. In addition, current actual vehicle acceleration B2 is transmitted to driving-information supply device 80 via data bus 60, for example. As a function of the two acceleration values, namely target and actual vehicle acceleration B1, B2, driving information INF indicating a currently possible driving state, which is more optimal in terms of power consumption, is generated therefrom. This may be carried out by a mathematical operation, for example, by performing a subtraction or division operation on the two acceleration quantities B1, B2.

For example, if the result of the subtraction operation does not equal zero, a vehicle acceleration that differs from the present one is useful. The same holds when the result of the division operation is unequal to one. The information indicating the acceleration action to be taken may be directly inferred from the result that represents the target to actual acceleration ratio. If the result of dividing target acceleration B1 by actual acceleration B2 is greater than one, for example, the driver should accelerate; if the result is less than one, the driver should decelerate. When the actual acceleration is subtracted from the target acceleration, a negative result points to a negative acceleration option that is more efficient in terms of power consumption; a positive result points to a positive acceleration option.

Driving information INF that is generated by the above comparison, for example, is made available as a result. It allows a conclusion to be made as to whether a driving state that is more optimal in terms of consumption is possible and, in addition, indicates how to effect such a driving state. This may be implemented by a deceleration or by an acceleration.

It is also conceivable, however, that target and actual acceleration B1, B2 coincide, so that no action is to be undertaken by driver 110.

In addition, prior to being output to driver 100, acquired driving information INF may also be weighted with a grade- and velocity-dependent weighting or normalization factor, for example, in a processing unit 100, as a function of the driving situation. This may be used to respond to different situations, such as city or highway traffic, for example. Thus, at very high or very low velocities, the driving information output may be suspended, for example, in the case that no useful display is possible. For this purpose, from the actual velocity and the grade, together with one or more characteristic maps, for example, which may likewise be stored in processing unit 100, weighting factors are ascertained that are used for weighting driving information INF, for example, logarithmically, in order to provide a better representation.

In particular, with regard to the weighting factor, a drive position dependency also comes under consideration, Depending on the drive position (gear), different gear stage-specific characteristic maps may then be used that take the accelerating performance and the power consumption of the vehicle in the particular drive position into consideration.

The weighting may be effected, for example, by multiplying the generated driving information INF by the weighting factor. Depending on the operating state, the weighting factor may have a non-linear characteristic curve, for example, in steady-state driving, to indicate minimal deviations from a constant velocity given a level roadway; however, given steep uphill driving, not to trigger a system reaction until there are relatively substantial acceleration deviations.

The generated weighted or unweighted driving information INF is subsequently output in an appropriate manner to driver 110, so that driver 110 is subsequently able to modify his/her driving behavior to achieve a driving state that is more optimal in terms of consumption. In this context, there is no need for a complex interpretation of the output driving information—as under the related art—to infer a recommendation of action to be taken. Driver 110 may immediately adapt the acceleration on the basis of the indication.

For the signaling process, driving information INF is fed to a display or a display device 90, which outputs the same. In this context, driving information INF may be signaled as an optically and/or haptically and/or acoustically processed signal.

Figure 3:
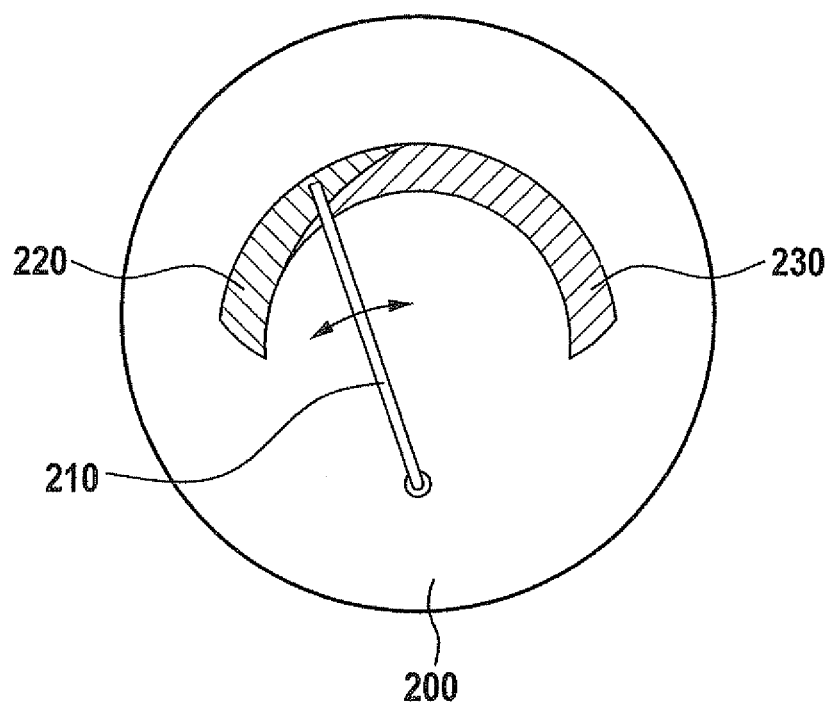
FIG. 3 shows one possible specific embodiment of an output device for outputting the generated driving information.

For example, a dial-type gauge 200 in accordance with FIG. 3 may be used, which has a needle 210 indicating whether one should accelerate or decelerate. To this end, red or green colored regions 220, 230 on the instrument may be used. For example, red region 220 characterizes an inefficient acceleration—for example, when driver 110 accelerates unnecessarily on a level roadway given a constant travel. On the other hand, green region 230 indicates that the driving of driver 110 is relatively fuel-efficient. Conceivable, in addition, is a third, for example, yellow region (not shown), that indicates that vehicle 20 is decelerating, which may be evaluated differently, depending on the driving situation. When driver 110 temporarily drives the vehicle more slowly, for example, due to an inattentiveness, then this is disadvantageous. If driver 110 intentionally wants to decelerate, then it is self-evident that this is positive for the consumption.

In addition, a signal may be output as a haptic signal, for example, via an accelerator pedal (gas pedal) of vehicle 20 or a steering wheel, etc. Possible signal forms would include a vibration, a back-pressure sensing that is dependent on the driving state, one or more pulses, etc.

The output may also be in acoustic form, for example, by the outputting of a signal tone, a sequence of signal tones, a continuous tone, etc. It is conceivable in this context for the acoustic signal to be in such a form that it is possible to discern, on the basis of the frequency, whether one should accelerate or decelerate.

The method is suited, in particular, for outputting the driving information for use in the case of steady-state driving, thus when it is desirable to maintain an (at least virtually) constant velocity over a certain period of time. In this case, driver 110 may be immediately made aware of avoidable acceleration fluctuations when driving on a level roadway. To this end, an especially finely resolving weighting factor may be selected, for example. When driving on terrain having uphill and, respectively, downhill grades, consumption-optimized acceleration and deceleration options are provided that have been adapted as a function of the grade.

In acceleration phases between two shift points, the method is suited for signaling the most fuel-efficient driving state, in particular the most fuel-efficient acceleration. In this context, a shift point signifies an instant of clutch engagement or clutch disengagement. In the present case, the method may be suitably applied then may be upon clutch engagement, for the purpose of engaging a gear (drive position) to the point of clutch disengagement, for example, for the purpose of engaging a next, further or no drive position in the acceleration phases disposed therebetween. In the arbitrarily selected driving operation state, starting with the engagement of the gear (drive position), driver 110 may control his/her acceleration in a consumption-optimized process and, as the case may be, usefully adapt the same. In the clutch-disengaged operating state (idling), an exception may be made, as there is no need for signaling a more fuel-efficient option.

The procedural functionality, respectively the system in accordance with the exemplary embodiments and/or exemplary methods of the present invention may be optionally activated or deactivated in the vehicle. This may be accomplished, for example, in conjunction with an Eco or sport mode.

What is claimed is:

1. A method for outputting driving information to indicate a power consumption-optimized driving state to a driver of a motor vehicle, the method comprising:
    ascertaining, by a computer processor, a target value of an acceleration of the vehicle that is calculated to provide consumption that is optimal at conditions of at least one current operating state quantity of the vehicle and at least one tractive-resistance quantity;
    ascertaining an actual vehicle acceleration by a transducer device;
    generating the driving information as a function of the ascertained target vehicle acceleration and of the actual vehicle acceleration by the processor; and
    determining, by the processor and based on the at least one tractive-resistance quantity, whether to output the driving information via an output device, the determining being performed according to a condition that the driving information is not output because of a value of the at least one tractive-resistance quantity, even where the actual vehicle acceleration deviates from the ascertained target value of the acceleration.

2. A device for outputting driving information to indicate a power consumption-optimized driving state to a driver of a motor vehicle, comprising:
    a transducer device to ascertain an actual vehicle acceleration;
    an output device; and
    a processing device, wherein the processing device is configured to:
        ascertain a target value of an acceleration of the vehicle that is calculated to provide consumption that is optimal at conditions of at least one current operating state quantity of the vehicle and at least one tractive-resistance quantity;
        generate the driving information as a function of the ascertained target vehicle acceleration and of the actual vehicle acceleration; and
        determine, based on the at least one tractive-resistance quantity, whether to output the driving information via the output device, the determination being performed according to a condition that the driving information is not output because of a value of the at least one tractive-resistance quantity, even where the actual vehicle acceleration deviates from the ascertained target value of the acceleration.

3. The device of claim 2, wherein the processing device is a control unit.

4. The device of claim 2, wherein the at least one current operating state quantity includes at least one of a vehicle velocity and an engine speed.

5. The device of claim 2, wherein, through the at least one current operating state quantity, at least one of the following quantities is taken into account: (i) longitudinal vehicle acceleration, (ii) drive position information, (iii) vehicle weight, and (iv) an indication as to whether the vehicle is operated with a trailer.

6. The device of claim 2, wherein the output of the driving information is in a way that allows the driver to recognize whether the actual vehicle acceleration is less than or greater than the target vehicle acceleration of the driving state that is optimal in terms of consumption.

7. The device of claim 2, wherein the driving information is weighted or valuated with a weighting factor that differs, in particular, as a function of the drive position.

8. The device of claim 2, wherein the driving information is at least one of optically, haptically, and acoustically output in the motor vehicle.

9. The device of claim 2, wherein the driver information is output during at least one of a steady-state driving operation and in acceleration phases between a first shift point and a second shift point, the first shift point signifying an instant of clutch engagement, and the second shift point signifying an instant of clutch disengagement.

10. A motor vehicle, comprising:
    a device for outputting driving information to indicate a power consumption-optimized driving state to a driver of a motor vehicle, including:
        a transducer device to ascertain an actual vehicle acceleration;
        an output device; and
        a processing device, wherein the processing device is configured to:
            ascertain a target value of an acceleration of the vehicle that is calculated to provide consumption that is optimal at conditions of at least one current operating state quantity of the vehicle and at least one tractive-resistance quantity;
            generate the driving information as a function of the ascertained target vehicle acceleration and of the actual vehicle acceleration; and
            determine, based on the at least one tractive-resistance quantity, whether to output the driving information via the output device, the determination being performed according to a condition that the driving information is not output because of a value of the at least one tractive-resistance quantity, even where the actual vehicle acceleration deviates from the ascertained target value of the acceleration.

11. The motor vehicle of claim 10, wherein the processing device is a control unit.

12. A computer readable medium having a computer program, which is executable by a processing unit, comprising:
a program code arrangement having program code for outputting driving information to indicate a power consumption-optimized driving state to a driver of a motor vehicle, by performing the following:
ascertaining a target value of an acceleration of the vehicle that is calculated to provide consumption that is optimal at conditions of at least one current operating state quantity of the vehicle and at least one tractive-resistance quantity;
ascertaining an actual vehicle acceleration by a transducer device;
generating the driving information as a function of the ascertained target vehicle acceleration and of the actual vehicle acceleration by the processor; and
determining, based on the at least one tractive-resistance quantity, whether to output the driving information via an output device, the determining being performed according to a condition that the driving information is not output because of a value of the at least one tractive-resistance quantity, even where the actual vehicle acceleration deviates from the ascertained target value of the acceleration.

13. A method for outputting driving information to indicate a power consumption-optimized driving state to a driver of a motor vehicle, the method comprising:
ascertaining, by a computer processor, a target value of an acceleration of the vehicle, which is optimal in terms of consumption, as a function of at least one current operating state quantity of the vehicle, and of at least one tractive-resistance quantity;
ascertaining an actual vehicle acceleration by a transducer device;
generating the driving information as a function of the ascertained target vehicle acceleration and of the actual vehicle acceleration by the processor; and
determining, by the processor and based on the at least one tractive-resistance quantity, whether to output via an output device the driving information, the determining being performed according to a condition that the driving information is not output because of a value of the at least one tractive-resistance quantity, even where the actual vehicle acceleration deviates from the ascertained target value of the acceleration.

14. The method of claim 13, wherein the at least one current operating state quantity includes at least one of a vehicle velocity and an engine speed.

15. The method of claim 13, wherein, through the at least one current operating state quantity, at least one of the following quantities is taken into account: (i) longitudinal vehicle acceleration, (ii) drive position information, (iii) vehicle weight, and (iv) an indication as to whether the vehicle is operated with a trailer.

16. The method of claim 13, wherein the output of the driving information is in a way that allows the driver to recognize whether the actual vehicle acceleration is less than or greater than the target vehicle acceleration of the driving state that is optimal in terms of consumption.

17. The method of claim 13, wherein the driving information is weighted or valuated with a weighting factor that differs, in particular, as a function of the drive position.

18. The method of claim 13, wherein the driving information is at least one of optically, haptically, and acoustically output in the motor vehicle.

19. The method of claim 13, wherein the method is applied in at least one of a steady-state driving operation and in acceleration phases between a first shift point and a second shift point, the first shift point signifying an instant of clutch engagement, and the second shift point signifying an instant of clutch disengagement.

20. The method of claim 13, wherein the at least one tractive-resistance quantity represents a grade of a roadway upon which the motor vehicle is traveling.

21. The method of claim 13, wherein the target value of acceleration is a positive acceleration by which the vehicle's speed would be increased, and the driving information is generated as a function of the actual vehicle acceleration being determined, in a comparison to the target value of positive acceleration, to be less than the target vehicle acceleration.

22. The method of claim 13, wherein the at least one tractive-resistance quantity includes at least one of a rolling resistance, an air resistance, a climbing resistance, an acceleration resistance, and a roadway grade.

* * * * *